(12) United States Patent
Huwyler et al.

(10) Patent No.: US 12,305,583 B2
(45) Date of Patent: May 20, 2025

(54) METHOD AND APPARATUS FOR USING BIOFUELS IN ENGINES HAVING EMISSION CONTROL SYSTEMS

(71) Applicant: Optimus Technologies, Inc., Pittsburgh, PA (US)

(72) Inventors: Colin N. Huwyler, Pittsburgh, PA (US); Jonathan Ewing, Pittsburgh, PA (US); Kevin Smyth, Pittsburgh, PA (US)

(73) Assignee: Optimus Technologies, Inc., Pittsburgh, PA (US)

( * ) Notice: Subject to any disclaimer, the term of this patent is extended or adjusted under 35 U.S.C. 154(b) by 0 days.

(21) Appl. No.: 18/272,197

(22) PCT Filed: Jan. 14, 2022

(86) PCT No.: PCT/US2022/012586
§ 371 (c)(1),
(2) Date: Jul. 13, 2023

(87) PCT Pub. No.: WO2022/155510
PCT Pub. Date: Jul. 21, 2022

(65) Prior Publication Data
US 2024/0068419 A1    Feb. 29, 2024

Related U.S. Application Data

(60) Provisional application No. 63/137,433, filed on Jan. 14, 2021.

(51) Int. Cl.
*F02D 19/08*    (2006.01)
*F02D 19/06*    (2006.01)
(Continued)

(52) U.S. Cl.
CPC ....... *F02D 19/081* (2013.01); *F02D 19/0652* (2013.01); *F02D 41/029* (2013.01); *F02D 2041/389* (2013.01)

(58) Field of Classification Search
CPC .. F02D 19/081; F02D 19/0652; F02D 41/029; F02D 2041/389
(Continued)

(56) References Cited

U.S. PATENT DOCUMENTS 9,995,225 B2    6/2018   Huwyler et al.
10,119,506 B2   11/2018  Huwyler et al.
(Continued)

FOREIGN PATENT DOCUMENTS

CN    104847515 B  *  9/2018  .......... F02D 41/402
DE    102007031770 A1   1/2009
(Continued)

*Primary Examiner* — Lindsay M Low
*Assistant Examiner* — Omar Morales
(74) *Attorney, Agent, or Firm* — The Webb Law Firm

(57) ABSTRACT

Internal combustion engines, including diesel engines, can safely and efficiently operate using alternative fuels by ensuring the emissions system always performs the regeneration process using an appropriate fuel. An electronic control unit that communicates with the fuel delivery system and the emissions control system of an engine inhibits the regeneration activity until an appropriate fuel is present, waits until the regeneration event is completed and then directs the engine to continue operation with the alternative fuel.

20 Claims, 12 Drawing Sheets

(51) Int. Cl.
*F02D 41/02* (2006.01)
*F02D 41/38* (2006.01)

(58) Field of Classification Search
USPC .......................................... 123/431
See application file for complete search history.

(56) References Cited

U.S. PATENT DOCUMENTS

| | | |
|---|---|---|
| 10,202,950 B2 | 2/2019 | Huwyler et al. |
| 10,385,812 B2 | 8/2019 | Huwyler et al. |
| 2002/0007805 A1 | 1/2002 | Green |
| 2008/0190097 A1 | 8/2008 | Wada et al. |
| 2009/0007549 A1 | 1/2009 | Hagio et al. |
| 2010/0050612 A1* | 3/2010 | Dyrbusch ............. F01N 3/0253 60/303 |
| 2011/0030334 A1* | 2/2011 | Garcia ................... F01N 3/36 60/39.094 |
| 2017/0037789 A1 | 2/2017 | Huwyler et al. |

FOREIGN PATENT DOCUMENTS

| | | | |
|---|---|---|---|
| EP | 1574690 A1 | | 9/2005 |
| JP | 2008298064 A | * | 12/2008 |
| JP | 201319283 A | | 1/2013 |
| JP | 2013019283 A | * | 1/2013 |
| WO | WO-2018078415 A1 | * | 5/2018 |

* cited by examiner

METHOD AND APPARATUS FOR USING BIOFUELS IN ENGINES HAVING EMISSION CONTROL SYSTEMS

CROSS-REFERENCE TO RELATED APPLICATIONS

This is the United States National Phase of International Application No. PCT/US2022/012586 filed Jan. 14, 2022, and claims priority to U.S. Provisional Patent Application No. 63/137,433, filed Jan. 14, 2021 the disclosures of which are hereby incorporated by reference in their entireties.

BACKGROUND OF THE INVENTION

Field of the Invention

Alternative fuels have distinct advantages in terms of environmental impact and sustainability. For that reason, there is a significant and growing interest in deployment of alternative fuels and regulatory movement throughout the world that is moving society to increasingly lower emission fuels. Biofuels, that is fuels derived from biogenic sources, non-petroleum or crude oil sources, in particular have shown to be promising.

However, biofuels have different physical and chemical characteristics that don't necessarily permit the immediate substitution of alternative fuels such as biofuels for petroleum-based fuels without modifications to the engine, the emission control system or both.

Those skilled in the art will recognize that there exists a type of diesel fuel known as "renewable hydrocarbon diesel" ("RHD"). This fuel results from a refining process that uses vegetable oils or animal fats to make a diesel fuel that is virtually indistinguishable from diesel fuel refined from crude oil. When the term "diesel" is used in this Application, it should be construed so as to include diesel fuel refined from petroleum, from vegetable oils such as an RHD product, or other generally approved fuels such as low biodiesel blends (1-20% biodiesel mixed with petroleum diesel) for which the emissions systems have been designed to operate on.

DESCRIPTION OF RELATED ART

There are two broad categories of emissions that are typically regulated which are generally referred to as "tailpipe" emissions and "lifecycle" emissions. Tailpipe emissions are the result of the direct combustion of fuel in an engine. Most are viewed as pollutants. These emissions are expelled from the engine through the engine's exhaust system. They are generally localized and the direct result of the engine's operation. Lifecycle emissions, on the other hand, are typically carbon-type emissions that take into account the total emission contribution of a fuel from its origin, through its final end use. Lifecycle emissions are calculated "well to wheel" that is, they are determined as an energy/emissions balance from the origin to the end use.

For petroleum-based fuels, these lifecycle emissions incorporate the total emission cycle from the extraction operations of the crude oil, global shipping operations, processing and refining, transportation and delivery, and end use combustion emissions. Biofuels lifecycle emissions, on the other hand, often have very low, neutral, or even negative total emissions. In some calculations, biofuels can account for negative carbon sequestered in biological matter during growth, production, or as a result of being derived from a secondary waste stream and incorporate the emissions from the refining, transportation and delivery, and end use combustion emissions. Due to these very low and in some cases negative carbon lifecycle emissions, biofuels are of significant value to decarbonizing the economy. As a result of the combined increase in regulatory requirements and consumer demand to lower tailpipe and lifecycle emissions, biofuels are becoming increasingly attractive and are being introduced and used in higher volumes and concentrations into engine and emissions systems that were originally designed for traditional petroleum-based fuels.

In response to regulatory requirements for lower tailpipe emissions, engine manufacturers have, over the years, attempted to reduce these emissions and reduce the dangerous pollutants that they may contain. Various technologies have been developed by the original equipment engine manufacturers (each, an "OEM"), each having a different approach. Familiar examples include exhaust gas recirculating ("EGR") valves, diesel oxidation catalysts ("DOC"), selective catalytic reduction ("SCR") systems, and diesel particulate filters ("DPF").

EGR valves redirect some portion of the engine's inert exhaust gases back into the engine intake system so that those gases can dilute the total 02 content of the combustion chamber and reduce peak cylinder temperatures in an attempt to reduce targeted exhaust gases such as NON.

DOCs oxidize diesel exhaust emissions using a catalyst to reduce pollutants by converting carbon monoxide ("CO") and hydrocarbons ("HC") into carbon dioxide ("$CO_2$") and water vapor. Standalone DOCs can be used independently to reduce tailpipe emissions, or they can be used to precondition or pre-treat exhaust gases in conjunction with other after-treatment components.

SCR systems are active emissions control systems which monitor real-time engine oxides of nitrogen ("NO N") emissions and use a liquid-reductant agent (typically a high-purity urea) injected into the exhaust stream mixed with exhaust gases to react with a specific catalyst type for the purpose of NO N emissions reduction. The introduction of the high purity urea by way of a dedicated SCR dosing injector in connection with the catalyst results in a chemical reaction that produces $N_2$, $H_2O$, and, $CO_2$.

DPFs are catalyst-coated primary filter substrates designed to collect diesel soot and ash as well as other byproducts from combustion and cylinder consumption of crankcase oil. The byproducts are solids, however, and as these particulates accumulate and ultimately clog the particulate filter, exhaust backpressure increases and reduces the overall efficiency of the engine by requiring additional work to be performed for the exhaust gases to be pushed through the DPF and out the exhaust system. This efficiency loss can significantly reduce the fuel efficiency of the engine and thus the overall operating costs of the engine. Due to the rapid accumulation of soot and other particulates, there must be a process for cleaning the DPF that can be initiated while the engine is running. This can be accomplished by a process known as filter regeneration initiated by a "regeneration event", as those skilled in the art will recognize.

A "regeneration event", in broad terms, is accomplished by temporarily introducing or "dosing" additional fuel into some area of the engine or exhaust system to raise the operating temperature of that area and incinerate the soot and ash. In the prior art, this was usually accomplished with a dosing injector controlled by a dosing module which takes into account parameters including fuel temperature, fuel pressure, at the module, viscosity characteristics of the fuel, as well as determining exhaust temperatures following emission treatment. Various systems known in the prior art are able to determine when the DPF requires regeneration and commences a regenerative event as needed from time to time. In the prior art, this was usually accomplished using the same petroleum-based diesel fuel that the engine used to operate.

These emission control technologies or emission control systems, which can be utilized independently or in combination, result in a reduction of engine emissions and lower tailpipe emissions enabling engines to meet ever-increasing regulated emissions criteria. While these systems are usually viewed as effective in reducing noxious emissions from engines, they were designed for use with fuels, and in particular diesel fuels, that are derived from petroleum and crude oil.

Considering now the category of DPF and DOC regeneration, there are two approaches described in the prior art to accomplish this: active thermal regeneration and passive thermal regeneration.

As noted above, active regeneration employs thermal regeneration using additional heat to oxidize the soot particulates. The additional heat input can be derived from a variety of sources including increasing the exhaust temperature by a temporary change to the engine control strategy, specifically the fuel/air mixture; injecting additional fuel into the exhaust stream by way of a dedicated hydrocarbon (in the prior art, diesel fuel) dosing injector; injecting additional fuel into the cylinders on the exhaust stroke (sometimes referred to as cylinder post injection); or occasionally electric heating of the exhaust. Active thermal regeneration oxidizes the particulates and soot by the introduction of various combinations of heat, $O_2$, and $NO_2$ to create less harmful gaseous byproducts, such as $CO_2$.

Systems which do not introduce heat or other elements or compounds to oxidize the particulates and soot during normal operating conditions are referred to as passive regeneration systems. Passive systems utilize catalysts to lower the oxidation temperature of the soot or particular matter so that they may be cleared from the exhaust system.

Unfortunately, limited consideration has been given so far as to the future use of biofuel with respect to engine and emission control system designs. As noted above, the vast majority of today's engines were originally intended for use with traditional diesel fuels. The convergence of the incompatibility of current systems and components with an increased desire for biofuel utilization becomes problematic as biofuels generally have very different properties than their traditional counterparts. As a result, some biofuels are inconsistent with current emission control system designs. For long term reliability of both the engine and emissions systems, and to achieve the goals of carbon reduction, modifications to and reconfigurations of these current systems is not only desirable but essential. With the use of high concentrations of biofuels, such as biodiesel fuel, properties such as flash point, oxygenation, spray patterns, and metal composition can all have detrimental impacts on OEM emissions systems and must be considered in the operation of these systems. Otherwise, the use of biodiesel in a diesel engine can cause ineffective operation of and even damage to the OEM emissions control system, particularly those systems equipped with injectors that temporarily inject or "dose" additional amounts of fuel into some portion of the engine and/or emission control system.

One of the most concerning adverse effects is the accumulation of unburned fuel in the emission system. This accumulation is due to the fact that biodiesel has a higher viscosity and flashpoint than diesel. The atomization and spray pattern of the droplets in combination with the increased flash point of the biofuel results in sub-par performance of the OEM emission control system and incomplete combustion for thermal regeneration events. This incomplete combustion can lead to unburned fuel accumulation in the exhaust system which then has the potential to ignite causing uncontrolled fuel burning in the engine exhaust system. In addition, because of the incompatibility of geometry of the injector spray pattern with the characteristics of the biofuel or biofuel blend as well as those fuel characteristics themselves, the injection of biodiesel by way of an OEM dosing injector can result in the coating of the DOC/DPF elements with unburned fuel, DPF face plugging, incomplete combustion, fouling of the dosing injector, excessive smoke emitted from the exhaust due to an accumulation of unburned fuel in the exhaust system which may ignite and cause uncontrolled fuel burning in the exhaust system, and deactivation of the catalysts, all of which can result of severe damage to the after-treatment system if not the engine itself.

Although the embodiments discussed herein refer to the use of biodiesel fuel, one skilled in the art will recognize these approaches and system modifications are applicable to a wide variety of biofuels and emissions systems for diesel, gasoline, and gaseous fuel engines. It is therefore an object of this invention to provide methods and apparatus for enabling existing engine emission control systems to operate with engines using petroleum-based fuels, RHD, biofuels or a combination of these.

It is another object of this invention to prevent the introduction of biofuels into emission control systems that are not able to use them effectively.

Still another object is to prevent biofuel in an engine from reaching a dosing injector that was not designed to accept it.

Another object is to provide an automated process for allowing the use of petroleum-based fuels, RHD, and biofuels in engines equipped with emission control systems.

Yet another object is to permit engines to use biofuels while retaining their OEM dosing injectors.

Still another object is to provide an improved dosing injector that doesn't require extensive modification to the OEM fuel supply system.

SUMMARY OF THE INVENTION

The following summary is provided to introduce a selection of concepts in a simplified form that are further described below in the detailed description. This summary is not intended to identify key features or essential features of the claimed subject matter, nor is it intended to be used to limit the scope of the claimed subject matter.

A method of modifying the operation of an engine is disclosed that enables it to operate with a first fuel and a second fuel and comprises the steps of providing the ending with a fuel delivery system, an electronic control unit, and an emissions control system. The electronic control unit is configured to communicate with at least the emissions control system and the fuel delivery system. The engine operates on the second fuel, which is an alternative fuel such as a renewable fuel, biofuel or biodiesel.

As the engine operates on the second fuel, the electronic control unit may inhibit the normal regeneration schedule or procedure in the engine, but will receive a notification from the emissions control system that a regeneration event is needed. In such a case, the electronic control unit will communicate with the fuel delivery system to switch its delivery of fuel to the engine to the first fuel prior to the occurrence of the regeneration event.

In certain embodiments, the disclosed method also involves purging the second fuel from the engine or just emission control system prior to the regeneration event before supplying the first fuel to the emissions control system. In other embodiments the regeneration event is delayed until the emission control system is purged. Once the regeneration event is complete, the disclosed method may direct that the second fuel be delivered to the engine once again for resumed operations.

In disclosed embodiments, the emissions control system comprises a dosing injector, a dosing fuel line, and a dosing flush valve in fluid communication with the engine's fuel delivery system. When a regeneration event is requested, the electronic control unit directs the dosing flush valve to flush the second fuel out of the dosing injector and dosing fuel line by supplying the fuel delivery system with the first fuel. In still other embodiments, the emissions control system comprises a dosing injector that is in fluid communication only with the first fuel.

In certain other embodiments, a disclosed method of modifying the operation of an engine to enable operation with a first fuel and a second fuel, includes providing the engine with an electronic control unit, a fuel delivery system comprising a first fuel container for containing the first fuel and a second fuel container for containing second fuel, and an emissions control system, the electronic control unit configured to communicate with the emissions control system and the fuel delivery system.

Next, the engine is operated using the second fuel and the emission control system notifies the electronic control unit when it is time for a regeneration event. In certain embodiments, the first fuel is supplied directly to the emission control system, usually to a dosing injector. In certain other embodiments, the engine is supplied with the first fuel.

BRIEF DESCRIPTION OF THE DRAWINGS

For a fuller understanding of the nature and advantages of the present invention, reference should be made to the following detailed description, taken in connection with the accompanying drawings, in which:

FIGS. 3A and 4A are not shown but it should be understood that they would be similar to FIG. 2A.

FIG. 4B-2 is a simplified schematic view of an alternate configuration of Embodiment 4.

Figure 1A:
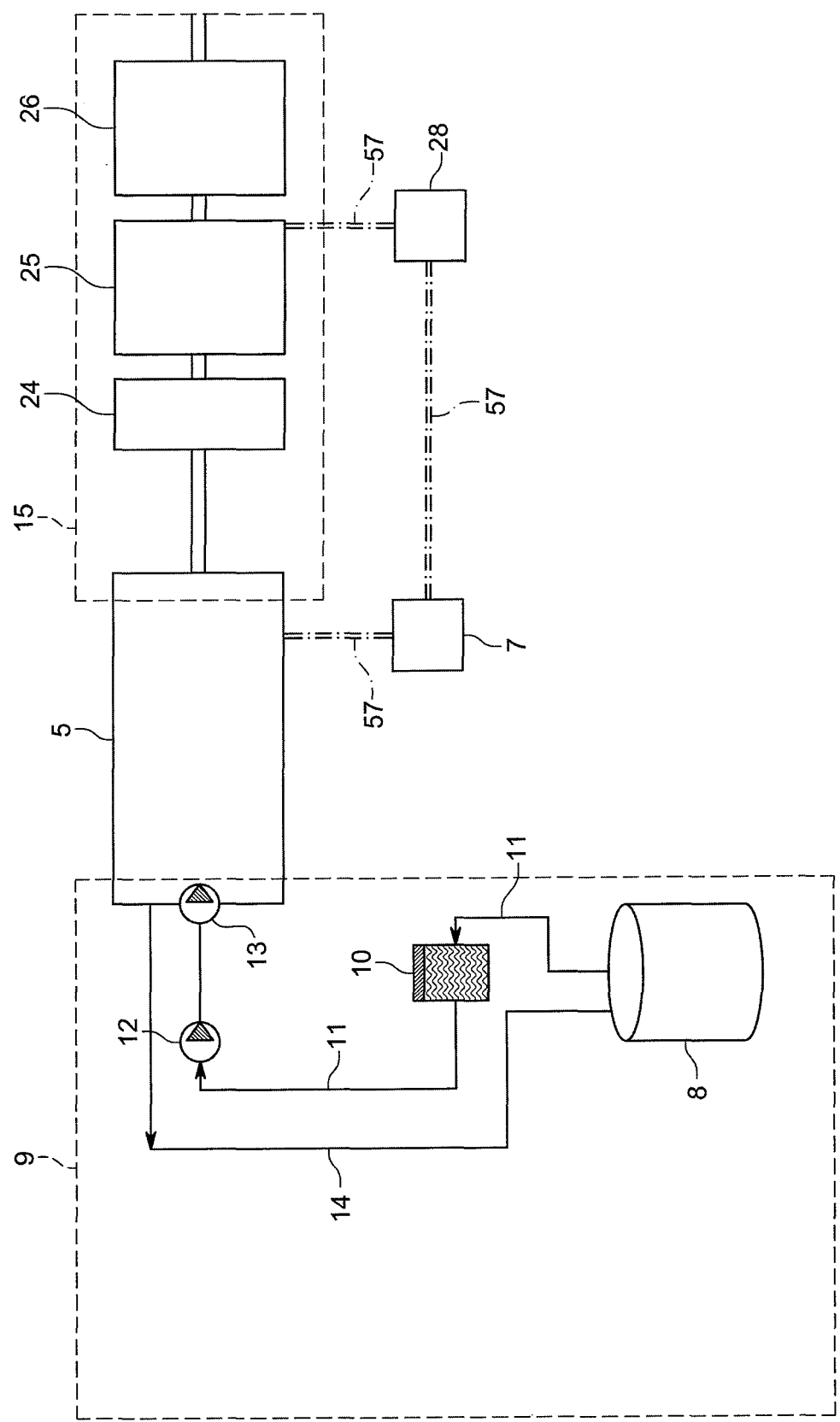
FIG. 1A is a schematic view of a factory or OEM emission control system intended for use with diesel fuel as the first fuel.

Those skilled in the art will recognize that these Figures are schematic illustrations showing the invention and its facets and features in their broadest depiction. An actual in-place system might include ancillary components known in the art some of which are illustrated in these Figures. It should be understood that additional less critical components are not illustrated herein for purposes of clarity and illustration.

DESCRIPTION OF THE INVENTION

The detailed description provided below in connection with the appended drawings is intended as a description of examples and is not intended to represent the only forms in which the present examples can be constructed or utilized. The description sets forth functions of the examples and sequences of steps for constructing and operating the examples. However, the same or equivalent functions and sequences can be accomplished by different examples.

References to "one embodiment," "an embodiment," "an example embodiment," "one implementation," "an implementation," "one example," "an example" and the like, indicate that the described embodiment, implementation or example can include a particular feature, structure or characteristic, but every embodiment, implementation or example can not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

Numerous specific details are set forth in order to provide a thorough understanding of one or more aspects of the described subject matter. It is to be appreciated, however, that such aspects can be practiced without these specific details. While certain components are shown in block diagram form to describe one or more aspects, it is to be understood that functionality performed by a single component can be performed by multiple components. Similarly, a single component can be configured to perform functionality described as being performed by multiple components.

The invention disclosed herein is primarily designed for engines that are able to use fuels such as diesel fuel and biofuels such as biodiesel. For purposes of clarity and to avoid wordiness, the term "biodiesel" will be used to refer to alternative fuels derived from non-petroleum-based sources such as biodiesel. In this regard, those skilled in the art will recognize that these alternative non-petroleum-based fuels may include fuels based on pure plant oils, pyrolysis derived bio-oils, and depolymerized plastic fuels, as well as similar style emission systems in gasoline engines using a gasoline/ethanol blend. The inventions disclosed shall in some instances refer to a first fuel and a second fuel. The first fuel shall be in reference to the OEM intended fuel such as diesel and the second fuel shall be in reference to the alternative fuel such as biodiesel. This nomenclature shall also be used to describe the diesel fuel supply system as the first fuel supply system and the biodiesel fuel system as the second fuel supply system. Common shared fuel system components shall be described as the fuel delivery system, or common engine fuel system and is in reference to the fuel delivery system components that are shared between the first and second fuel in some embodiments.

The present invention included embodiments with regard to the specific configuration of the emissions system and can be utilized in parts or as a whole.

For purposes of clarity and illustration, a summary of these embodiments will be presented first in chart format and then in narrative form.

into the combustion chamber of each cylinder during the exhaust stroke of the engine cycle. This system has no separate dosing injector. This additional fuel is forced by the exhaust stroke into the exhaust system and is then oxidized by the DOC or DPF system to create the necessary conditions for a regeneration event. When this is attempted using a biofuel such as biodiesel, there are two primary dangers: i) the fuel can weep down the cylinder walls and contaminate the crankcase oil causing accelerated polymerization and adding additional maintenance requirements and/or additional wear and tear by compromising the crankcase oil's ability to function as intended. ii) the injected fuel, when a biofuel, has a different flashpoint and combustion characteristic than diesel fuel, which can result in face plugging (buildup of the fuel on the DOC or DPF surface) or improper completion of the regeneration process.

To address these concerns, in a dual fuel system able to use diesel fuel, the first fuel, and a biofuel such as biodiesel fuel, the second fuel, this embodiment causes the engine's fuel delivery system to revert to the first fuel prior to the initiation of a regeneration event in order to allow the in-cylinder dosing to be completed using only the first fuel. Additionally, in this embodiment, the regeneration event may be delayed until all of the second fuel from inside the

| Embodiment | Initial Configuration | Applicant's Modification |
|---|---|---|
| 1 | Dual fuel system with no dosing injector in exhaust system; instead first fuel is injected through OEM fuel supply system to OEM fuel injectors directly into combustion chamber of engine cylinders typically during the exhaust stroke. | Regeneration event is delayed while engine fuel system is flushed of second fuel and operating only on first fuel. Second fuel is consumed by engine or flushed back to second fuel tank. Upon completion of regeneration event, on first fuel, engine operation on second fuel resumes. |
| 2 | Dual fuel system configuration in which fuel is supplied to emissions control system via a dedicated dosing injector that has a shared fuel supply. | Regeneration event is delayed while second fuel is flushed from fuel lines of dosing injector replacing it with only first fuel. Second fuel is consumed by engine or flushed back to second fuel tank. If OEM configuration is not suitable for flushing dosing injector of second fuel, a separate purge system is provided. Upon completion of regeneration event, on first fuel, engine operation on second fuel resumes. |
| 3 | Dual fuel system configuration in which fuel is supplied to emissions control system via a dedicated dosing injector. | Doser supply lines are isolated so they are only in fluidic connection with first fuel. If necessary, a flush valve or pressure regulation device is provided. Only first fuel is supplied to doser. Engine operation during the regeneration event can occur on first or second fuel as doser and emissions control system has been isolated only to first fuel. |
| 4 | Single fuel supply system configuration in which engine delivery fuel and emissions control fuel supply can be isolated. | A tank, pump, filter, and fuel lines are added so that the emissions control system operates on a dedicated system containing the first fuel. Engine operation is independent and isolated from the fuel supplied to the emissions control system. Regeneration events can occur only on first fuel and are independent of the fuel supplied to the engine. |

Figure 2A:
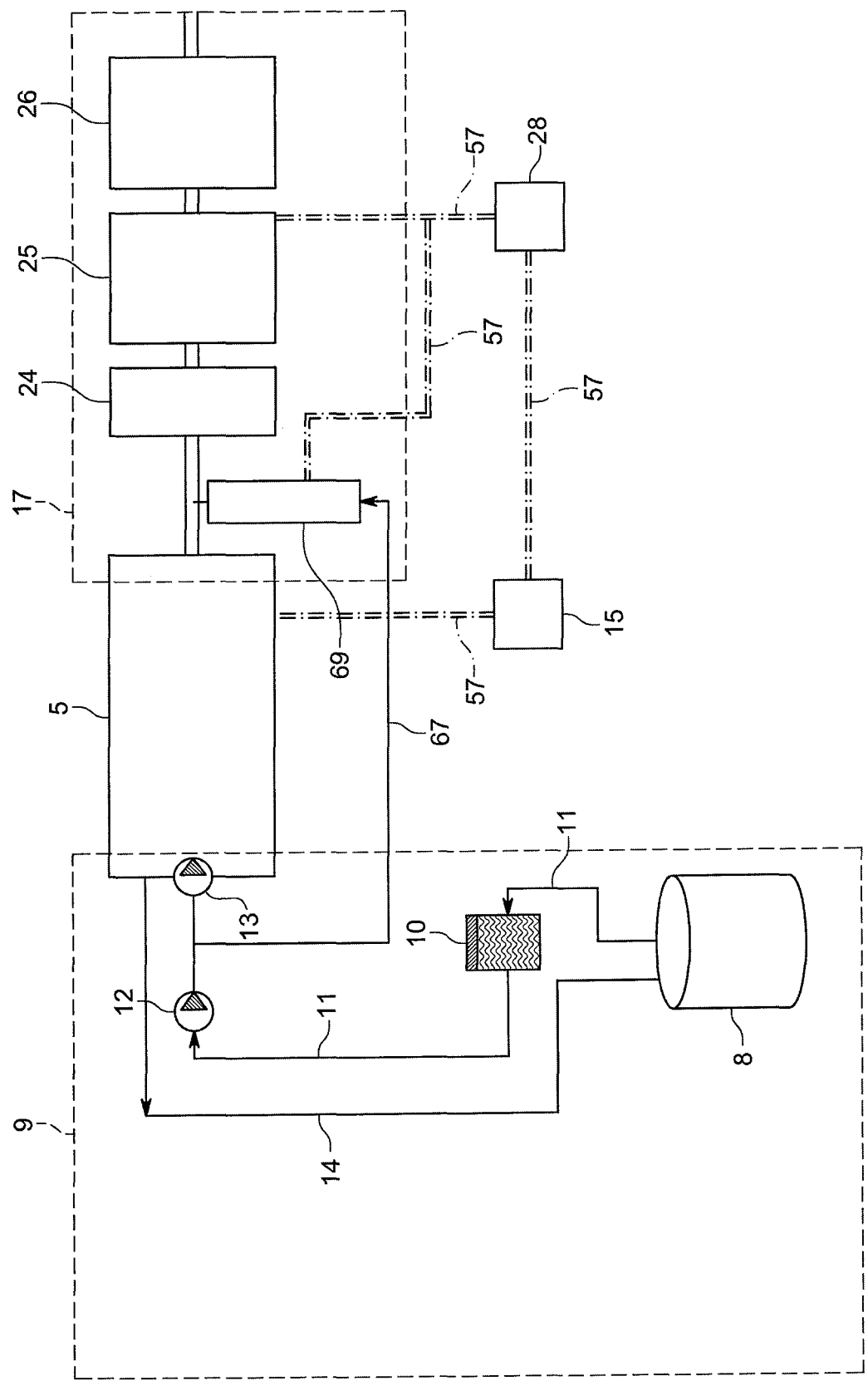
FIG. 2A is a simplified schematic view of a factory or OEM emission control system intended for use with diesel fuel as the first fuel which includes a dosing injector in the emissions control system. This Figure is also applicable to Embodiments 3 and 4.

Two typical prior art emission control systems for use on diesel engines are illustrated in FIGS. 1A and 2A. FIG. 1A does not include a dosing injector as a part of the emission control system while FIG. 2A does include that feature.

Embodiment 1

Embodiment 1 set forth in the table relates to a DOC/DPF system with dosing injection in the actual engine cylinders. One method of creating a regeneration event in the prior art is "in-cylinder" dosing, during which additional fuel (the prior art contemplates the first fuel/diesel fuel) is injected fuel injectors has been either consumed by the engine or returned to the second fuel tank before injection of any additional in-cylinder dosing fuel begins. Once the regeneration event has been completed, the second fuel portion of the dual fuel system will re-engage so as to supply second fuel to the engine. This embodiment further includes a standalone electronic control system for control of the dual fuel system which utilizes and/or receives information and data from the OEM emission control system such as delta pressure, and soot loading to determine when a regeneration event is needed. One skilled in the art will recognize that a standalone electronic control system is not strictly necessary for control of the dual fuel system in the event that the OEM configuration includes an engine, or emissions control system electronic controller has additional inputs, outputs, and processing capacity to control the components of the dual fuel system.

In one embodiment the second fuel system electronic control module is in communication with the engine, after-treatment, or emissions control system, electronic control module that controls the regeneration event. When the secondary fuel system engages, the electronic control unit broadcasts a message to inhibit the emission control system from initiating a regeneration. When the DPF system requests a regeneration event, the electronic control unit controlling the secondary fuel system maintains the broadcast of the inhibiting message and uses the regeneration request as a trigger to switch the fuel system back to the first fuel supply system. During this process, the electronic controller turns the fuel supply valve off (thus delivering the first fuel into the engine). After a calculated delay based on volume of the second fuel in the engine and fuel delivery system (targeting when the second fuel has been flushed out of the engine and common fuel lines and back to the second fuel tank), the return valve is deactivated now placing the engine in a state that is drawing from and returning to the first fuel tank. The specific conditions of operation of this embodiment such as engine size, injectors fuel volumes, engine load, fuel consumption, etc. factor into the delay calculation to ensures the fuel delivery system and injectors have been fully flushed of the second fuel. Once the flushing process is complete, the electronic control unit stops broadcasting the inhibit message and allows the regeneration process to proceed on the first fuel. Once the regeneration event is completed, the system is able to reengage operation on the secondary fuel.

The default embodiments presented use electromechanical solenoid valves that are controlled by actuation from an electronic control unit. One skilled in the art will recognize that other methods for selection between two fluid systems are possible such as a combination of check valves utilizing differential pressure for fluid selection. These additional embodiments still allow for the systems to accomplish the desired outcome and are suitable for use if application practicality dictates.

The default embodiments presented use an additional electronic control module for the secondary fuel system, one skilled in the art will recognize that with the appropriate configuration, the engine, after-treatment, or other system's electronic control module can control the secondary fuel system functions.

FIG. 1A depicts an OEM fuel system designated generally by reference numeral 9. In this Figure, the first fuel from tank 8 is delivered to engine 5 through fuel lines 11 and first fuel filter 10 by low-pressure pump 12 and high-pressure pump 13. Engine 5 is further provided with an OEM Engine Control Unit ("ECU") 7 and a first OEM emission control system generally designated by reference numeral 15. OEM emission control system 15 includes an emissions control/after-treatment control module ("ACM") 28 which is in communication with OEM ECU 7 and OEM emission system 15 by way of communication connection 57. This particular system further includes a diesel oxidation catalyst ("DOC") 24, a diesel particulate filter ("DPF") 25, and a selective catalytic reduction ("SCR") system 26. Those skilled in the art will recognize that these individual systems can be used individually or in any combination depending on the characteristics on engine 5.

Figure 1B:
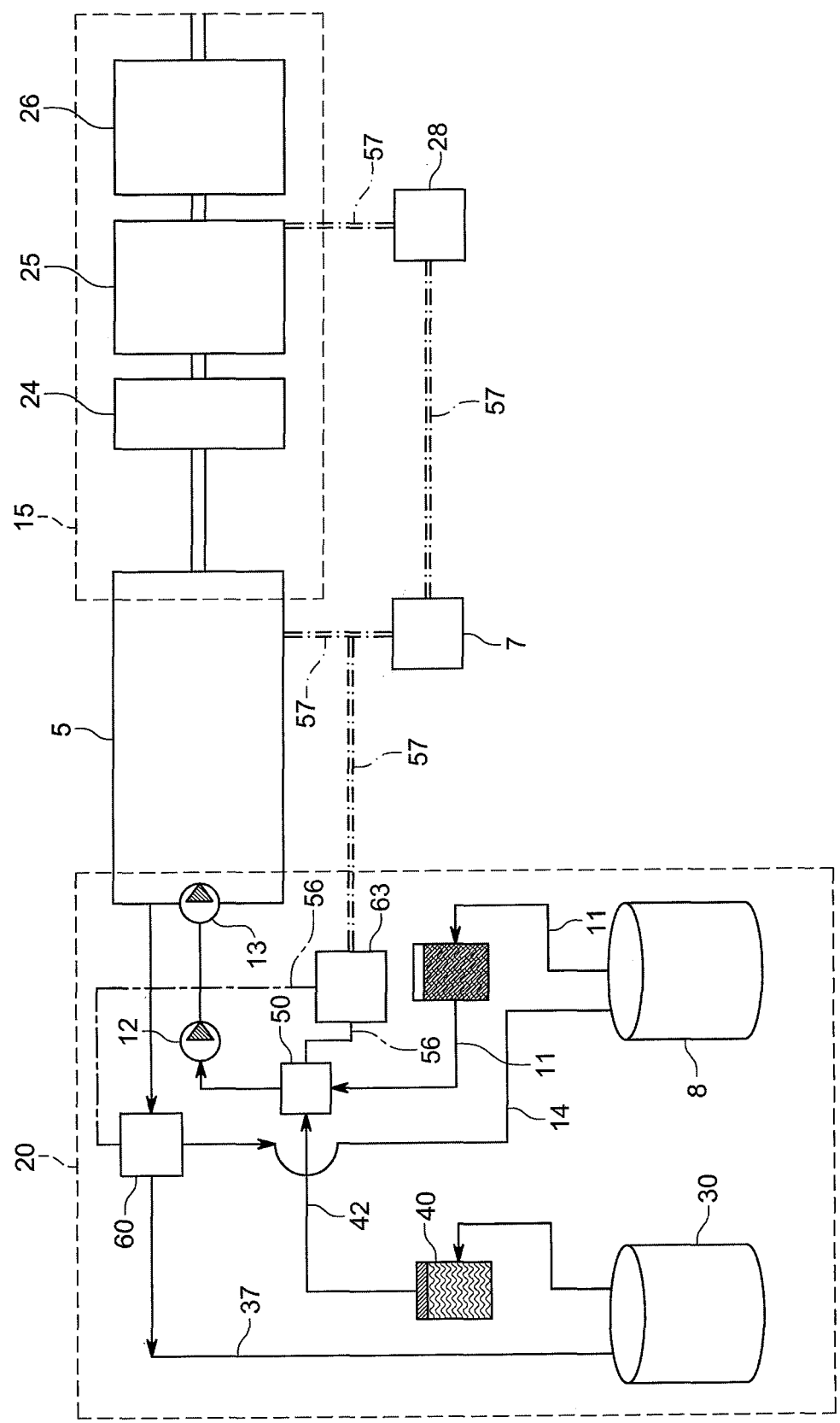
FIG. 1B is a simplified schematic view of the system in FIG. 1A which includes the modifications and features described in Embodiment 1.

Referring now to FIG. 1B which now includes a fuel system 20 which includes modifications to allow engine 5 to use both a first fuel and a second fuel, when the fuel system is modified so as to allow the use of secondary fuels, emission control system 15 will still include DOC 24, a DPF 25, or both as noted above which have a catalyst coated filter substrate designed to collect soot and ash as well as other byproducts from combustion and cylinder consumption of crankcase oil. However, these are solids and as DOC 24 and/or DPF 25 accumulate particulates, soot, and ash, exhaust backpressure increases and reduces the overall efficiency of the engine by requiring additional work to be performed for the exhaust gases to be pushed through the DPF 25 and out the exhaust system. This efficiency loss can have a significant impact on the fuel efficiency of the engine and thus the overall operating costs of the engine. Due to the rapid accumulation of soot and other particulates, there must be a process for cleaning DOC 24 and DPF 25 that can be initiated while the engine is running. This can be accomplished by a process known as filter regeneration initiated by a "regeneration event", as those skilled in the art will recognize. A "regenerative event", in broad terms, is accomplished by temporarily introducing or "dosing" additional fuel into some area of the engine to raise the operating temperature of that area and incinerate the soot and ash. Various systems known in the prior art are able to determine when DOC 24 and DPF 25 require regeneration and can commence a regenerative event as needed from time to time. In the prior art, this is usually accomplished using the same fuel as the engine consumed to operate. Traditionally, this first fuel was diesel fuel, a fuel refined from crude oil which is a petroleum-based product.

In emission control system 15 as depicted in FIG. 1B, regeneration is accomplished by causing high pressure pump 13 (in an embodiment, this can be the engine 5 fuel injection pump) to inject additional fuel into the cylinders of engine 5 during an exhaust stroke of the cycle of engine 5. This additional fuel is forced by the exhaust stroke of engine 5 into the exhaust system and is then oxidized by the DOC 24 or DPF 25 system to create the necessary conditions for a regeneration event. In this embodiment, emission control system 15 does not include a dosing injector, a feature in other types of emission control systems that will be described in further embodiments.

Figure 1C:
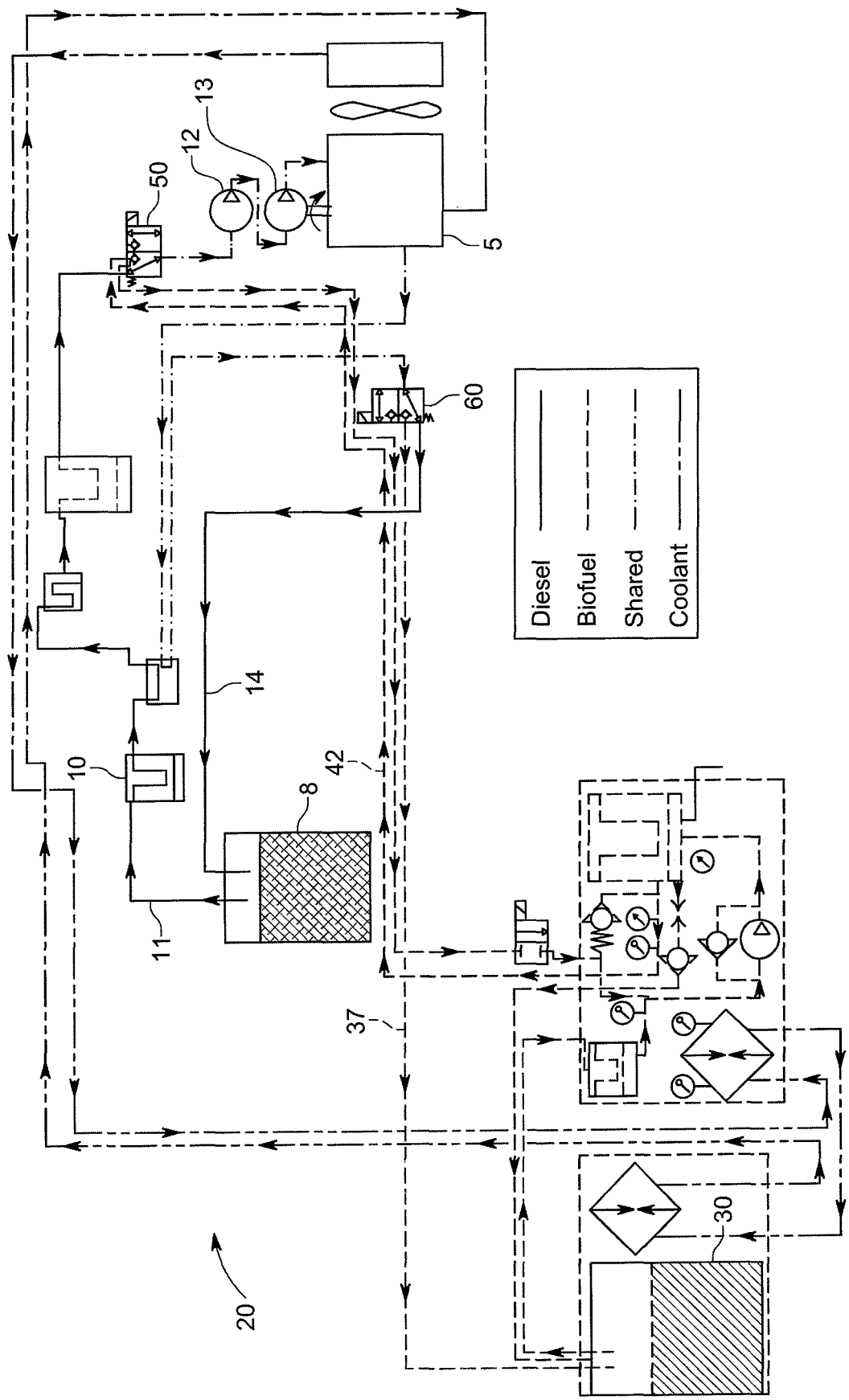
FIG. 1C is a more detailed schematic view of the configuration illustrated in FIG. 1B including the corresponding reference numerals.

As previously noted, and as illustrated in FIGS. 1B and 1C, engines such as engine 5 may be successfully converted so as to operate on secondary fuels like biofuels such as vegetable oils, biodiesel, etc. Examples of such a conversion as taught in the prior art include the following United States patents to Huwyler et al: 9,995,225, 10,119,506, 10,202,950, and 10,385,812.

Referring still to FIGS. 1B and 1C, a second fuel such as biodiesel fuel is contained in second fuel tank 30. It is drawn by low pressure fuel pump 12 through biodiesel fuel filter 40 by way of biodiesel fuel line 42. Fuel selector valve 50 is responsive to an onboard ECU 63 through a control signal connection 56, to be described in detail below, such that it can control the flow of the first fuel and the second fuel in a manner that engine 5 receives either the first fuel or the second fuel or a blend of these as determined by onboard ECU 63.

However, in an engine 5 which has been converted to operate on a second fuel in this manner, when emission control system 15 and its ACM 28 determine that DOC 24 and DPF 25 require regeneration while engine 5 is operating on a second fuel such as biodiesel, there are two primary dangers: i) the second fuel can weep down the cylinder walls and contaminate the crankcase oil causing accelerated polymerization and adding additional maintenance requirements and/or additional wear and tear by compromising the crankcase oil's ability to function as intended; and ii) the injected fuel, when a biofuel, has a different flashpoint and combustion characteristic than diesel fuel, which can result in face plugging (buildup of the fuel on the DOC 24 or DPF 25 surface) or improper completion of the regeneration process.

Still referring to FIGS. 1B and 1C, to address these concerns, in a dual fuel system which includes an onboard ECU 63 which communicates with ECU 7 by way of communication 57 as well as after-treatment control module ACM 28, and enables engine 5 to use the first fuel and a second fuel such as biodiesel fuel, this embodiment causes the engine's fuel supply and delivery system to revert to the first fuel prior to the initiation of a regeneration event in order to allow the in-cylinder dosing to be performed using only the first fuel.

To accomplish this, when regeneration is required, as determined by ACM 28, or the OEM ECU 7, the regeneration event is first delayed by onboard ECU 63 to remove or "flush" the second fuel from fuel lines 11 that are common/shared. Engine 5 will then burn any of the second fuel that remains in fuel lines 11.

Selector valve 50, which communicates with onboard ECU 63 by way of communication connection 56 is disposed so as to then cause first fuel to flow from first filter 10 through fuel lines 11 to engine 5 in response to onboard ECU 63 until all second fuel from in the fuel injectors has been either consumed by the engine or returned to the second fuel tank by way of return valve 60.

Regeneration is accomplished by causing high pressure fuel pump 13 to inject additional diesel fuel into the cylinders of engine 5 during the exhaust stroke. This results in the oxidation of soot and particulate matter in DOC 24 and DPF 25. Once the regeneration event has been completed, selector valve 50, again in response to onboard ECU 63, will once again supply second fuel to the engine 5.

Embodiment 2

Referring now to embodiment 2 of the table, the present invention further provides an embodiment for use in a dual fuel system in which the OEM first fuel's dosing injector in the DOC/DPF system must be shared as between the first fuel and the second fuel in a dual-fuel system, or may at least be potentially exposed to flows of both the first fuel or the first fuel and second fuels. As noted previously, injecting second fuels such as biodiesel or a biodiesel blends directly onto the DOC/DPF can be detrimental to the operation and components of the OEM systems.

In this embodiment, the OEM fuel system is modified so as to be able to "flush" or "purge" (i.e., eliminate) from the fuel system any of the second fuel by reverting the dual fuel system to the first fuel for an allotted or predetermined amount of time, so that the dosing injector (and the rest of the fuel system of course) only injects the first fuel. To accomplish this, the dual-fuel system delays the pending regeneration event, and reverts the engine's fuel supply and delivery systems so as to contain only the first fuel. After a defined amount of time, the embodiment initiates the regeneration event once the fuel lines, engine, and components, have been purged of the second fuel and contain only the first fuel. Once the regeneration has been completed, the dual fuel system resumes operation on the second fuel. This embodiment can also utilize a standalone fuel control system for logic and control of the dual fuel system while also utilizing inputs from the OEM systems such as information from the emissions control system ex). delta pressure, soot loading, regeneration status, etc. to determine when a regeneration event is needed.

In another embodiment, some OEM fuel system configurations are not suitable for purging the engine fuel lines feeding engine cylinders and the dosing injector. For these systems, this embodiment provides an additional purging system to effectively purge the dosing injector fuel line of the second. This embodiment may include additional fuel system lines, valves, and sensors as described below, in addition to the standalone control for logic and control of the dual fuel system, which receives inputs from the OEM after-treatment control system or other electronic control unit that controls the regeneration event. These inputs, such as delta pressure, soot loading, and regeneration status, allow the standalone controller to determine when a regeneration event is required. Prior to beginning a regeneration event, the dual fuel system reverts to first fuel operation, actuates the flush valves appropriately, flushes the dosing injector line so as to return the second fuel back to the second fuel tank and, after a defined amount of time necessary to complete the system flush, enables the DPF regeneration to occur with only the first fuel remaining in the fuel supply lines, fuel delivery lines, doser fuel lines, and other emissions control system components that are in fluidic connection to the fuel system. Once the regeneration event is completed, the engine fuel supply is able to reengage operation on the secondary fuel system.

In another embodiment the second fuel system electronic control module is in communication with the engine, after-treatment, or emissions control system electronic control module that controls the regeneration event. When the second fuel system engages, the electronic control unit which is controlling the secondary fuel system broadcasts a message that inhibits the emission control system from regenerating. When the DPF system requests a regeneration event, the secondary fuel system electronic control unit maintains the broadcast of the inhibiting message and switches back to supplying the engine from the first fuel system. During this process, the engine and fuel delivery system is purged of the second fuel by having the electronic controller turn off the supply valve (thus delivering the first fuel into the engine) and actuating the Doser Flush Valve to flush the Doser injector lines with the first fuel. After a calculated delay based on volume of the second fuel in the engine, doser supply lines, doser injector, and fuel delivery system (targeting when the second fuel has been flushed out of the engine and common fuel lines and back to the second fuel tank), the return valve is deactivated now placing the engine in a state that is drawing from and returning to the first fuel tank. At this stage, the doser and doser supply lines have been flushed with the first fuel and the doser flush valve is now turned off. The specific conditions of operation of this embodiment such as engine size, injectors fuel volumes, engine load, fuel consumption, doser supply lines, doser injector configuration, etc. factor into the delay calculation to ensures the fuel delivery system and injectors have been flushed of the second fuel. Once the flushing process is complete, the secondary fuel system's electronic control unit stops broadcasting the inhibit message and allows the regeneration process to proceed on the first fuel. Once the regeneration event is completed, the engine fuel supply is able to reengage operation on the secondary fuel system.

With reference to FIG. 2A, OEM fuel system 9 is shown in connection with an alternate OEM emission control system 17 includes a dosing injector 69, which injects the first fuel at a predetermined point into emission control system 17, rather than into the cylinders of engine 5 as shown in FIG. 1A. Dosing injector 69 is supplied with the first fuel from dosing injector supply line 67 by low pressure fuel pump 12.

Figure 2B:
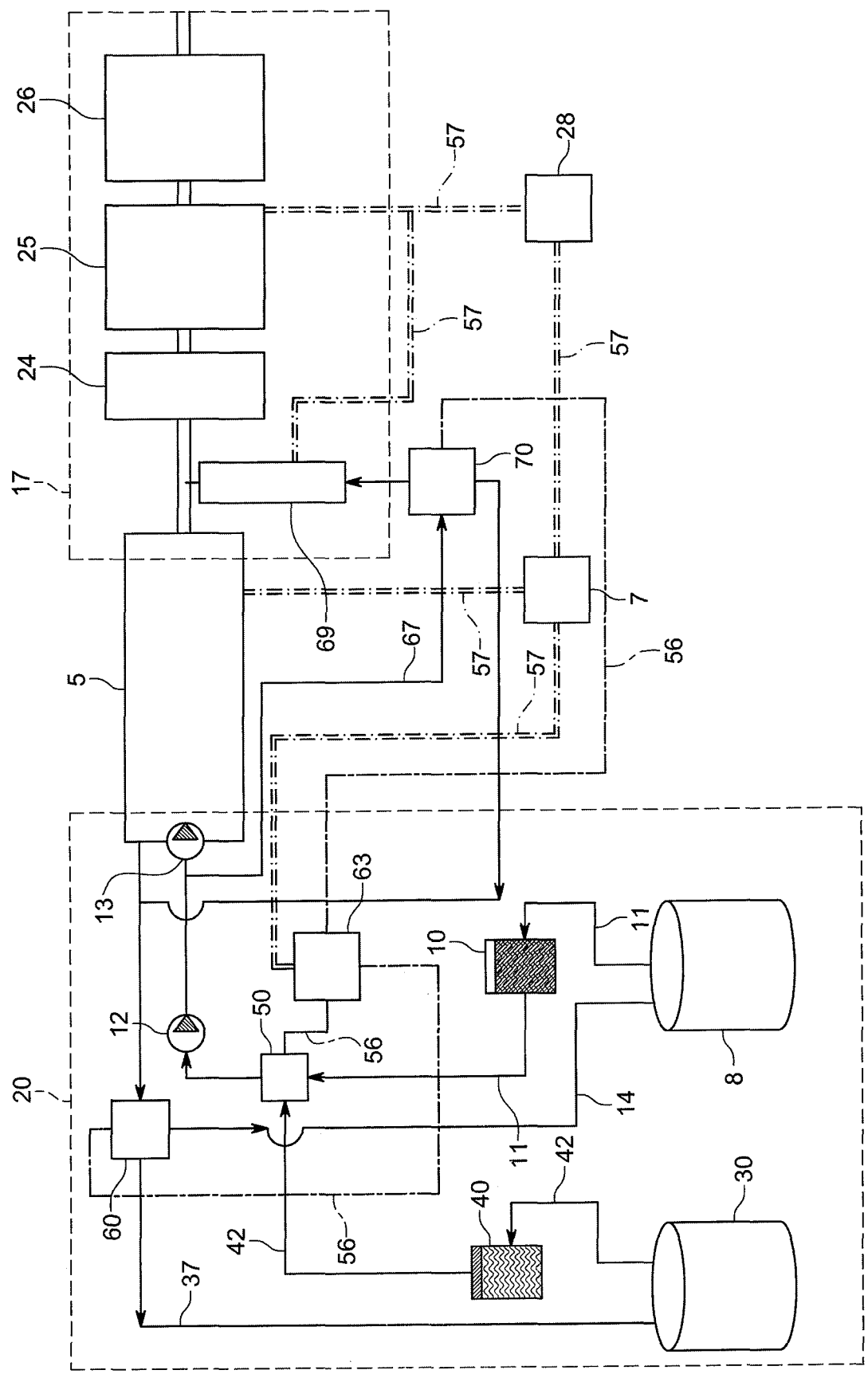
FIG. 2B is a schematic view of the system in FIG. 2A which includes the modifications and features described in Embodiment 2.
Figure 2C:
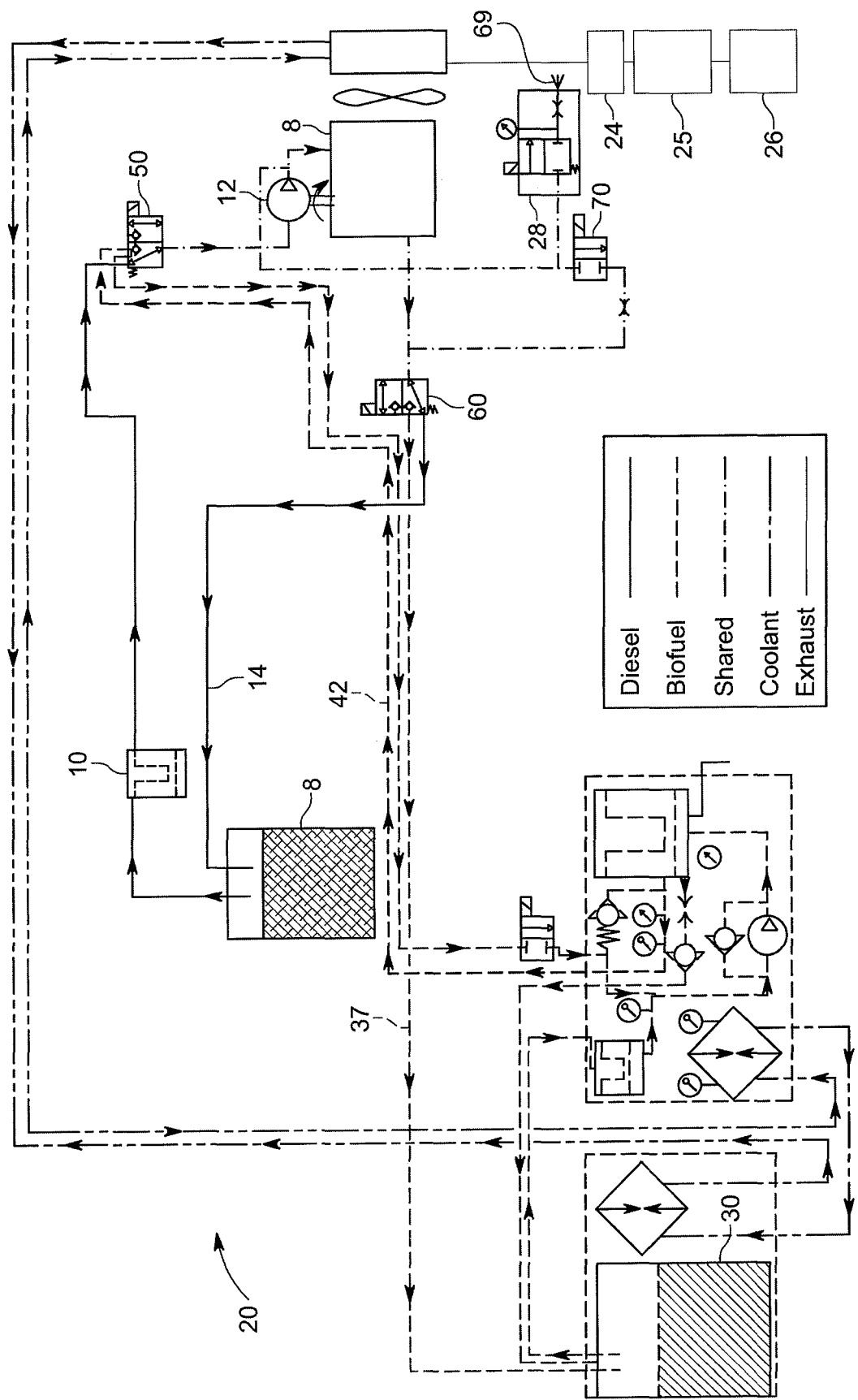
FIG. 2C is a more detailed schematic view of the configuration illustrated in FIG. 2B including the corresponding reference numerals and which includes the modifications and features described in Embodiment 2.

However, as illustrated in FIGS. 2B and 2C, when this system is adapted to a dual fuel system 20 so as to operate on a first fuel and a second fuel such as biodiesel, low pressure pump 12 must be "shared" by fuel first supply line 11 and second supply line 42.

Referring still to FIGS. 2B and 2C, in this embodiment, dosing injector 69 now receives fuel from low pressure fuel pump 12 though second dosing fuel line 67 and dosing injector flush valve 70. Dosing injector 69 is hydraulically connected to dosing injector flush valve 70 and is in communication with ACM 28 by way of communication connection 57. Dosing injector flush valve 70 receives control signals from onboard ECU 63.

When DOC 24 or DPF 25 call for a regeneration event, and engine 5 has been operating on the second fuel, the regeneration event is delayed by OEM ECU 7 and onboard ECU 63 while onboard ECU 63 causes fuel selector valve 50 to revert the fuel system to the first fuel, such that engine 5 is temporarily operating on the first fuel during the regeneration event. Fuel selector valve 50 is responsive to onboard ECU 63 by way of control connection 56 and is then disposed so as to provide the first fuel to engine 5 through the first fuel supply line 11. Dosing injector flush valve 70, which can receive fuel from pump 12 through injector supply line 67 is then opened by onboard ECU 63 by way of control connection 56 to flush dosing injector supply line 67 and dosing injector 69 with the first fuel. Any second fuel remaining in engine 5 and dosing injector 69 is flushed back to the second fuel tank 30 through fuel return line 37. When injector supply line 67 and dosing injector 70 have been flushed of the second fuel, onboard ECU 63 causes return valve 60 to close so that the first fuel is returned to first fuel tank 8. At that point, engine 5 is operating on the first fuel and supply line 67 contains only the first fuel.

In a further embodiment, onboard ECU 63 is able to delay the regeneration event by a predetermined amount of time while engine 5 continues to operate in order to assure that supply line 67 contains no secondary fuel.

Onboard ECU 63 then allows the regeneration event to commence. When the regeneration event has completed, onboard ECU 63 communicates with ECU 7 and ACM 28 by way of communication connection 57 to resume operation of engine 5 on secondary fuel.

Embodiment 3

Referring now to embodiment 3, a DOC/DPF system is disclosed with dosing injector isolated in a dual fuel system so as to use only diesel fuel. This embodiment is applicable to a dual fuel system wherein the OEM fuel filter housing, fuel pump, after-treatment hydrocarbon dosing controls, and after-treatment dosing injector are completely isolated from the second fuel system and are only in fluidic connection with the first fuel. During the initial engine warmup period, the OEM fuel system is delivering the first fuel to the engine and after-treatment system. Once operating conditions for the second fuel are met; a pair of fuel selector valves actuate open, allowing the second fuel to be delivered to the engine under pressure by way of an added fuel pump. Simultaneously, a relief valve opens, sending the first fuel that was once supplying the engine, now only to the hydrocarbon dosing module and the dosing injector. The remaining first fuel that was not being used by the dosing module and injector, is routed back to the first fuel tank. Maintaining the use of the first fuel in the hydrocarbon dosing module and injector in its current engine state ensures proper operation of the exhaust oxidation in the particulate filter, thus maintaining efficient particulate removal on and within the filter module. This embodiment allows a regeneration cycle to proceed no matter what fuel the engine is using, whether it is operating either the first fuel mode or the second fuel mode, with dosing only occurring using the first fuel.

Another embodiment demonstrating the emissions control system/after-treatment system and DOC/DPF isolation is shown when an OEM engine has a fuel filter module, an electric pump, and fuel pressure sensor with the hydrocarbon dosing module and dosing injector is in line to the fuel rail on the common or shared side of the dual fuel system configuration. In this instance, the dosing module and dosing injector would be moved from the fuel rail (common side) and routed in front of the electric pump and filter but before the fuel supply selector valve. This ensures that the dosing module maintains the correct pressure but is isolated from the second fuel when delivery of the second fuel begins to go to the common fuel system, fuel rail and engine. In this embodiment, the regeneration activity would act in the exact manner as the OEM intended on the first fuel.

In another embodiment, the second fuel system is in communication with the engine or after-treatment electronic control module, or the module that controls the regeneration event. When the second fuel system engages, the second fuel system electronic control unit broadcasts a message that inhibits the emission control system from regenerating. When the DPF system requests a regeneration event, the electronic control unit maintains the broadcast of the inhibiting message and switches back to the first fuel system. In this configuration the low-pressure first fuel pump continues to supply the first fuel to the doser injector. A Doser Flush Valve in this instance is utilized to provide a flush path for the first fuel so that the pump is not "dead headed" against the doser valve when the second fuel supply system is engaged. This configuration my require the addition of a restricted orifice or some type of pressure regulation device to ensure the doser injector is supplied with the adequate pressure of the first fuel. When the DPF system requests a regeneration event, the electronic control unit maintains the broadcast of the inhibiting message and switches the engine system back to the first fuel. During this process the electronic control unit for the second fuel system closes the Doser Flush Valve to close the flush pathway and the engine and fuel delivery system is purged of the second fuel by having the electronic controller turn off the supply valve (thus delivering the first fuel into the engine). After a calculated delay based on volume of the second fuel in the engine and fuel delivery system (targeting when the second fuel has been flushed out of the engine and common fuel lines and back to the second fuel tank), the return valve is deactivated now placing the engine in a state that is drawing from and returning to the first fuel tank. The specific conditions of operation of this embodiment such as engine size, injectors fuel volumes, engine load, fuel consumption, etc. factor into the delay calculation to ensures the fuel delivery system and injectors have been flushed of the second fuel. Once the flushing process is complete, the electronic control unit stops broadcasting the inhibit message and allows the regeneration process to proceed on the first fuel. Once the regeneration event is completed, the engine fuel supply is able to reengage operation on the secondary fuel system.

In another embodiment, the second fuel system electronic control module is in communication with the engine, after-treatment, or emissions control system electronic control module that controls the regeneration event. When the second fuel system engages, the secondary fuel system's electronic control unit broadcasts a message that inhibits the emission control system from regenerating. When the DPF system requests a regeneration event, the electronic control unit maintains the broadcast of the inhibiting message and switches back to the first fuel system. In this configuration an additional low-pressure pump is added to the first fuel system continue to supply fuel to the doser injector. Filtered fuel in this embodiment is drawn through the first fuel system filter. When the DPF system requests a regeneration event, the electronic control unit maintains the broadcast of the inhibiting message and switches the fuel delivery system back to the first fuel supply system. During this process the electronic control unit for the second fuel system purges the engine and fuel delivery system of the second fuel by having the electronic controller turn off the supply valve (thus delivering the first fuel into the engine). After a calculated delay based on volume of the second fuel in the engine and fuel delivery system (targeting when the second fuel has been flushed out of the engine and common fuel lines and back to the second fuel tank), the return valve is deactivated now placing the engine in a state that is drawing from and returning to the first fuel tank. The specific conditions of operation of this embodiment such as engine size, injectors fuel volumes, engine load, fuel consumption, etc. factor into the delay calculation to ensures the fuel delivery system and injectors have been flushed of the second fuel. Once the flushing process is complete, the electronic control unit stops broadcasting the inhibit message and allows the regeneration process to proceed on the first fuel. Once the regeneration event is completed, the engine fuel supply is able to reengage operation on the secondary fuel system.

In another embodiment, the second fuel system electronic control module is in communication with the engine, after-treatment, or emissions control system electronic control module that controls the regeneration event. When the second fuel system engages, the electronic control unit broadcasts a message that inhibits the emission control system from regenerating. When the DPF system requests a regeneration event, the secondary fuel system's electronic control unit maintains the broadcast of the inhibiting message and switches back to the first fuel system. In this configuration an additional fuel filter and low-pressure pump are added to the first fuel system continue to supply fuel to the doser injector. When the DPF system requests a regeneration event, the electronic control unit maintains the broadcast of the inhibiting message and switches the fuel delivery system back to the first fuel supply system. During this process the electronic control unit for the second fuel system purges the engine and fuel delivery system of the second fuel by having the electronic controller turn off the supply valve (thus delivering the first fuel into the engine). After a calculated delay based on volume of the second fuel in the engine and fuel delivery system (targeting when the second fuel has been flushed out of the engine and common fuel lines and back to the second fuel tank), the return valve is deactivated now placing the engine in a state that is drawing from and returning to the first fuel tank. The specific conditions of operation of this embodiment such as engine size, injectors fuel volumes, engine load, fuel consumption, etc. factor into the delay calculation to ensures the fuel delivery system and injectors have been flushed of the second fuel. Once the flushing process is complete, the electronic control unit stops broadcasting the inhibit message and allows the regeneration process to proceed on the first fuel. Once the regeneration event is completed, the system is able to reengage operation on the secondary fuel system.

In another embodiment, where the doser injector and doser fuel lines are completely isolated and functional on the first fuel, and the second fuel has operating conditions which are substantially similar to the operating conditions of the first fuel, and the engine is able to continue to operate on the second fuel while the emissions control system, doser, and regeneration event occurs on the first fuel, thus enabling the engine and fuel system to continue to operate on the second fuel for engine operations during which time, the regeneration event occurs on the first fuel. Note this possible in the embodiments in which the doser, doser supply lines, etc. are completely isolated and only in fluidic connection with the first fuel.

Figure 3B:
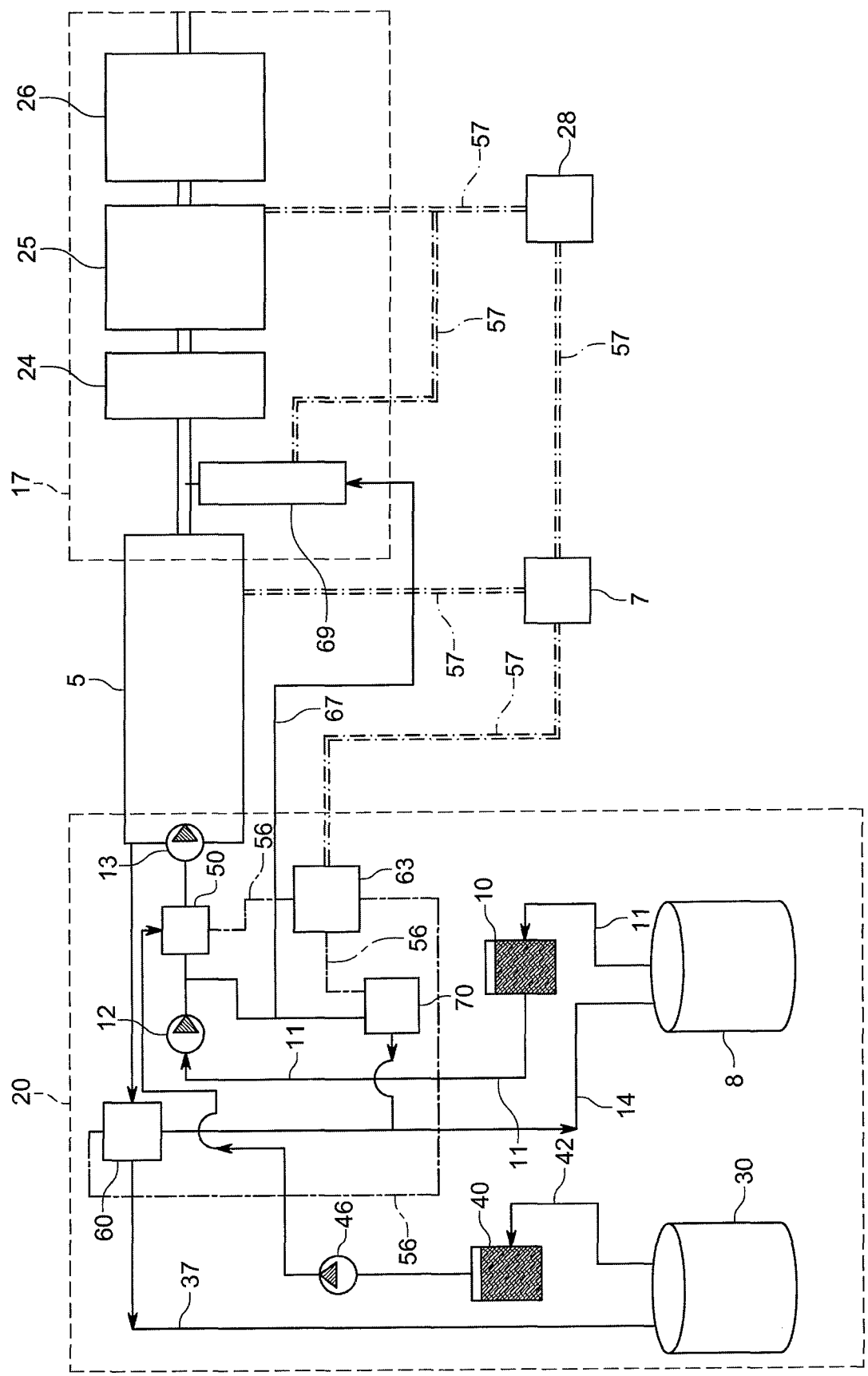
FIG. 3B is a schematic view of the configuration illustrated in FIG. 2A which includes the modifications and features described in Embodiment 3.
Figure 3C:
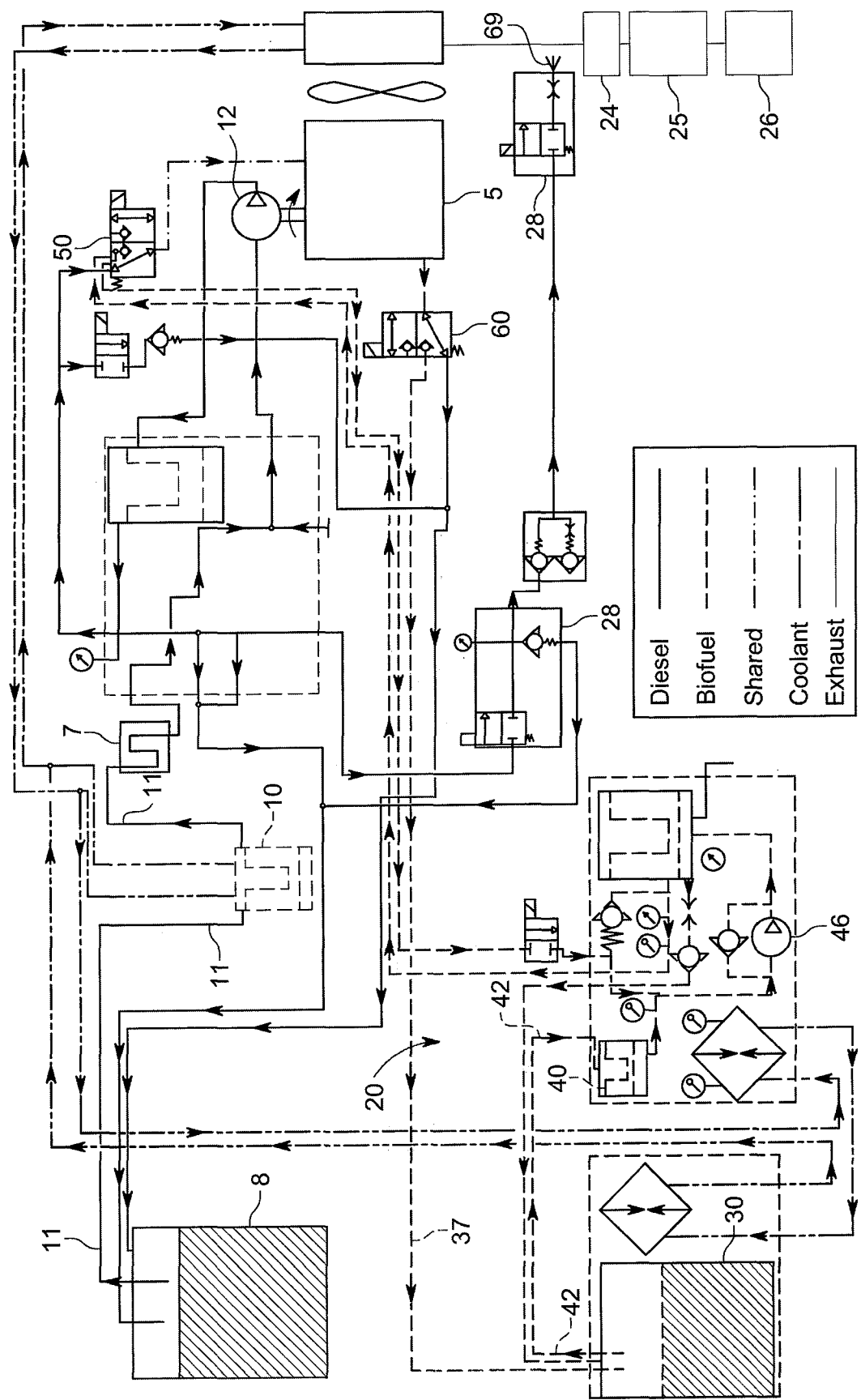
FIG. 3C is a more detailed schematic view of the configuration illustrated in FIG. 3B including the corresponding reference numerals and which includes the modifications and features described in Embodiment 3.

Referring now to FIGS. 3B and 3C, this embodiment is a variation of what is shown in FIGS. 2B and 2C. In this embodiment, first fuel line 11 can be isolated from the secondary fuel tank 30, secondary filter 40, and secondary fuel line 42 since secondary fuel line 42 is provided with its own low pressure pump 46. In this embodiment, low pressure pump 12 supplies only the first fuel to high pressure pump 13 and engine 5, although high pressure pump 13 can supply secondary fuel to engine 5 through secondary filter 40, secondary supply line 42 and selector valve 50 injector fuel line 67 and injector 69 receive only first fuel from low pressure pump 12. In this embodiment, dosing flush valve 70 which is responsive to onboard ECU 63 by way of control connection 56 provides a path for the first fuel to return to tank 8 through injector supply line 67 and first fuel return line 14 to first fuel tank 8.

When DOC 24 or DPF 25 request a regeneration event, engine 5 is flushed of prior to the regeneration event. Supply valve 50 is disposed by onboard ECU 63 to supply first fuel to engine 5. After engine 5 has operated for a sufficient time as determined by onboard EU 63, the regeneration event is permitted to proceed by onboard ECU 63. Once the regeneration event is completed onboard ECU 63 and supply valve 50 once again cause the engine 5 to receive the second fuel.

Embodiment 4

Referring now to Embodiment 4, a DOC/DPF system with dosing injector including a dedicated diesel fuel delivery system for the dosing injector is disclosed. This embodiment enables the engine to operate on a different fuel than the emissions control system/after-treatment system without the concerns of cross contamination risk presented in embodiment (2) above in which the first fuel lines are "purged" of the second fuel prior to regeneration. This enables the engine system to operate on a dedicated second fuel, or on a second fuel in a dual fuel manner but enables higher engine operating runtime on the second fuel due to the ability for the regeneration event to occur using the first fuel rather than the second fuel that is supplied to the engine.

This embodiment may include a separate "dedicated" first fuel pump which supplies first fuel from the engine's existing first fuel filter directly to the dosing injector, with associated fuel lines, and sensors, including level, temperature, and pressure, a fuel pump (standalone or synchronized with the engine's RPMs), a system controller, and the OEM after-treatment hydrocarbon dosing. In an alternative embodiment, a separate "dedicated" first fuel pump and fuel filter are used to supply the dosing injector. No fuel line contains both the first fuel and the second fuel. This embodiment of the system utilizes the engine's OEM emission control system for logic and controls of the dosing injector but utilizes the Applicant's components to provide the physical system for use with and to supply the first fuel to the emissions system.

In another embodiment, a dedicated fuel supply system for the secondary fuel would be utilized. This embodiment could result in minor modifications of the first fuel supply system to make it suitable for supplying the second fuel but does not require a complete addition of the dual fuel supply systems. In this embodiment a first fuel tank, filter and pump would be added to the emissions control system so to isolate the doser's operation only on the first fuel. In this embodiment, where the doser injector and doser fuel lines are completely isolated and functional on the first fuel, the engine is able to continue to operate on the second fuel while the emissions control system, doser, and regeneration event occurs on the first fuel, thus enabling the engine and fuel system to continue to operate on the second fuel for engine operations during which time, the regeneration event occurs on the first fuel.

Figures 1, 4B:
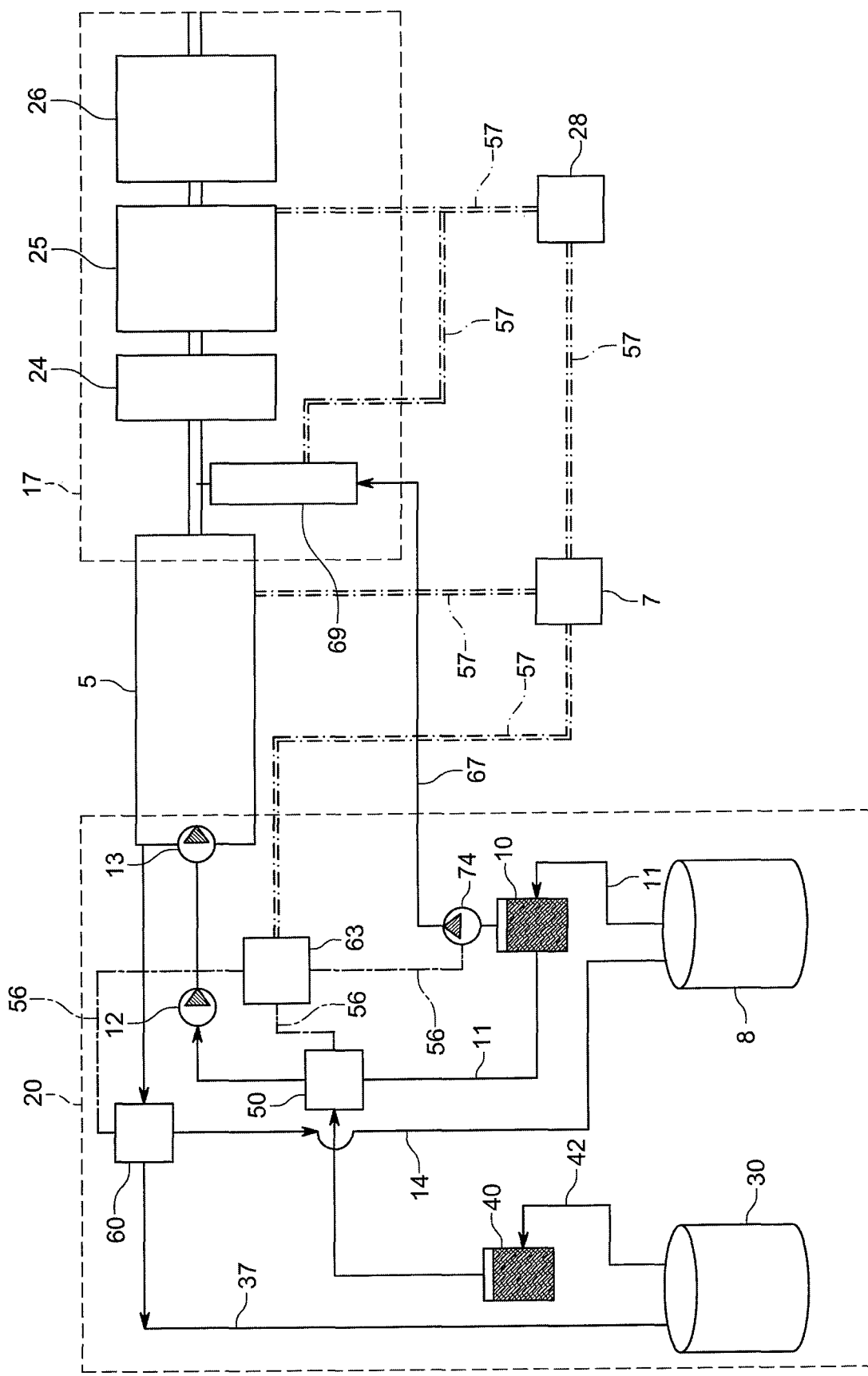
FIG. 4B-1 is a simplified schematic view of the configuration which includes the modifications and features described in Embodiment 4.

Referring now to FIG. 4B-1, a further embodiment is illustrated in which dosing injector 69 is supplied with first fuel through first fuel supply line 67 by a dedicated dosing injector pump 74 which receives the first fuel from the first fuel filter 10. In this embodiment, the engine 5 can be supplied with the second fuel while the dosing injector 69 is supplied only with the first fuel.

Figures 2, 4B:
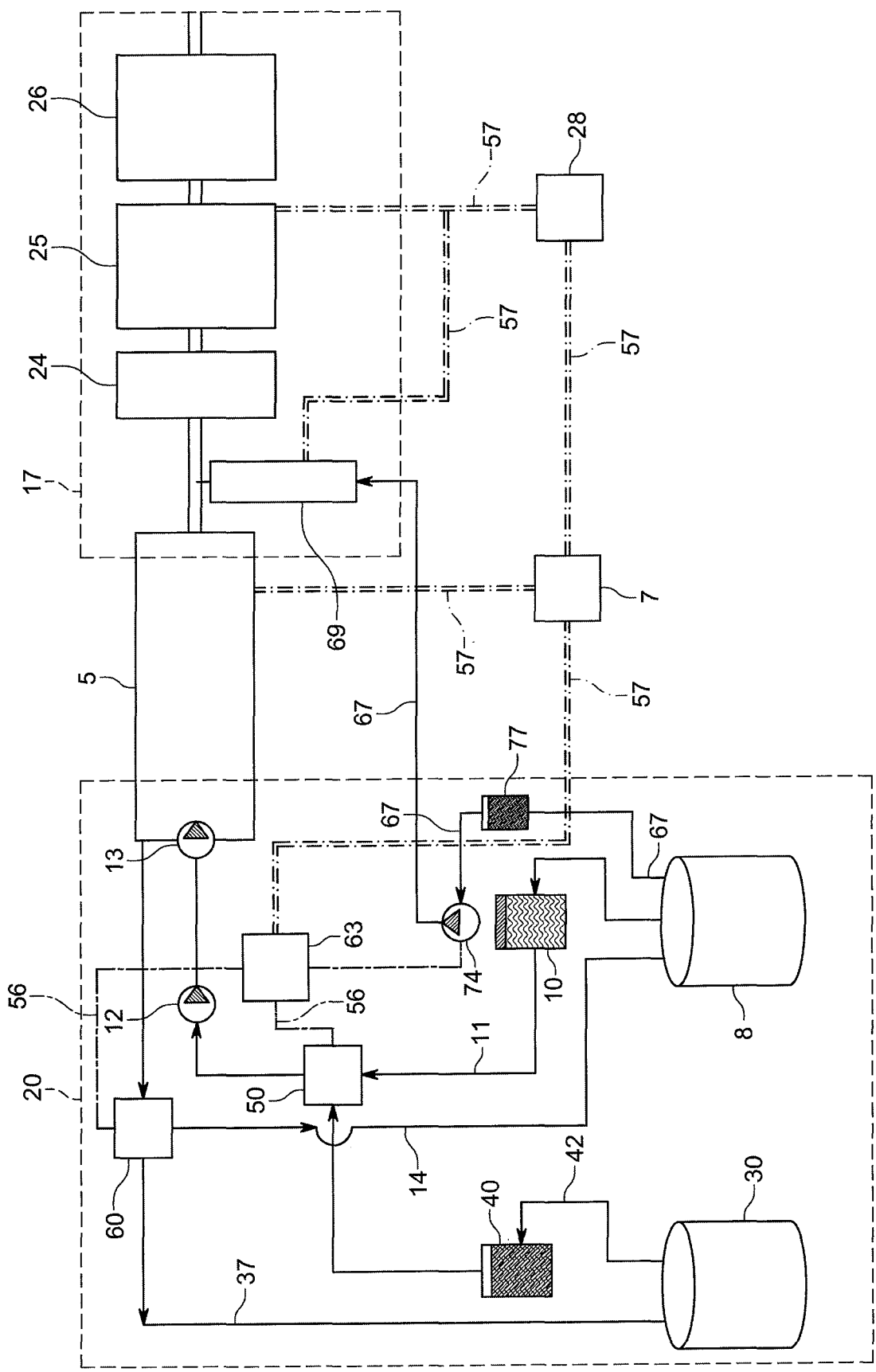
Figure 4C:
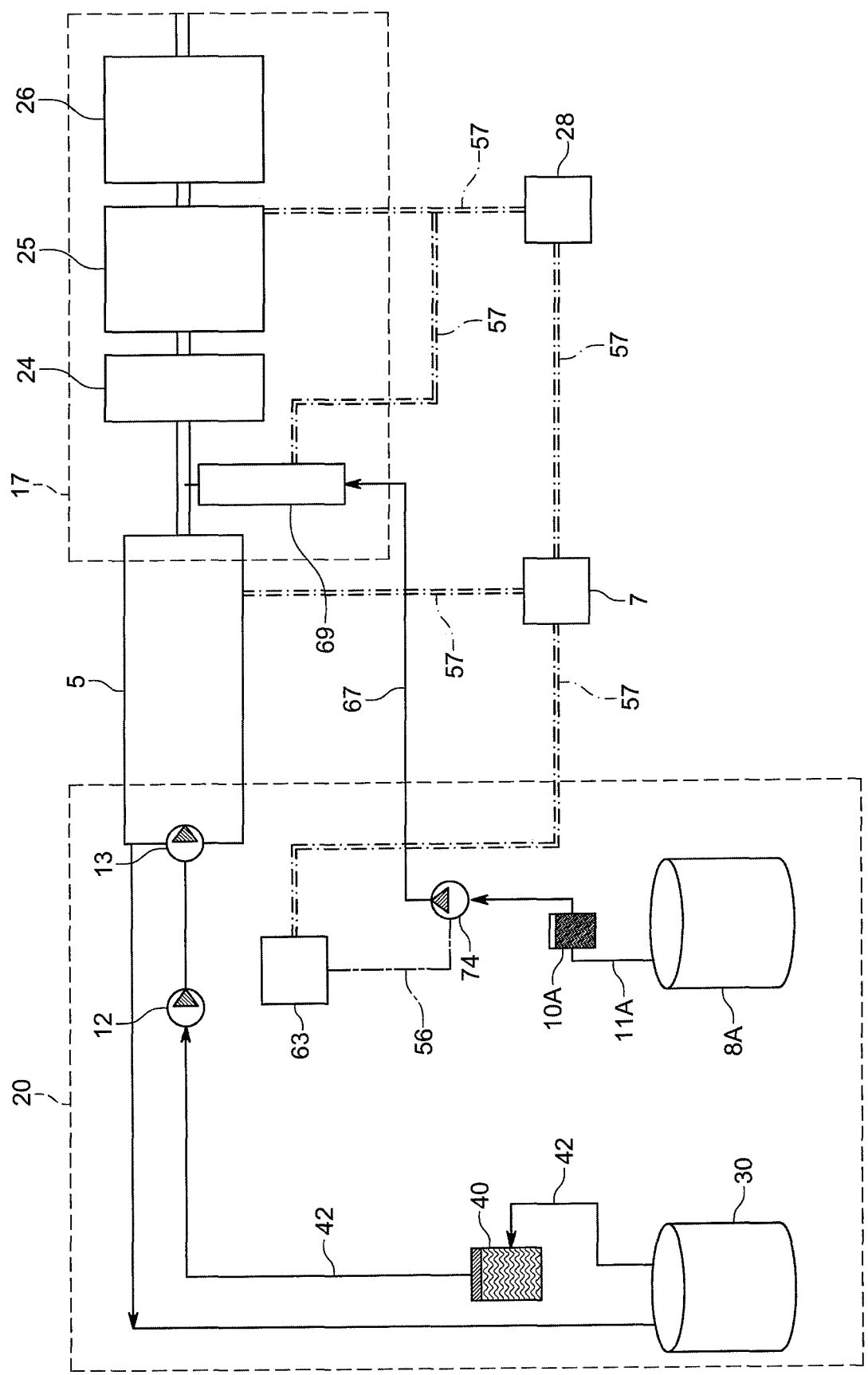
FIG. 4C is a simplified schematic view of another alternate configuration of Embodiment 4.
Figure 4D:
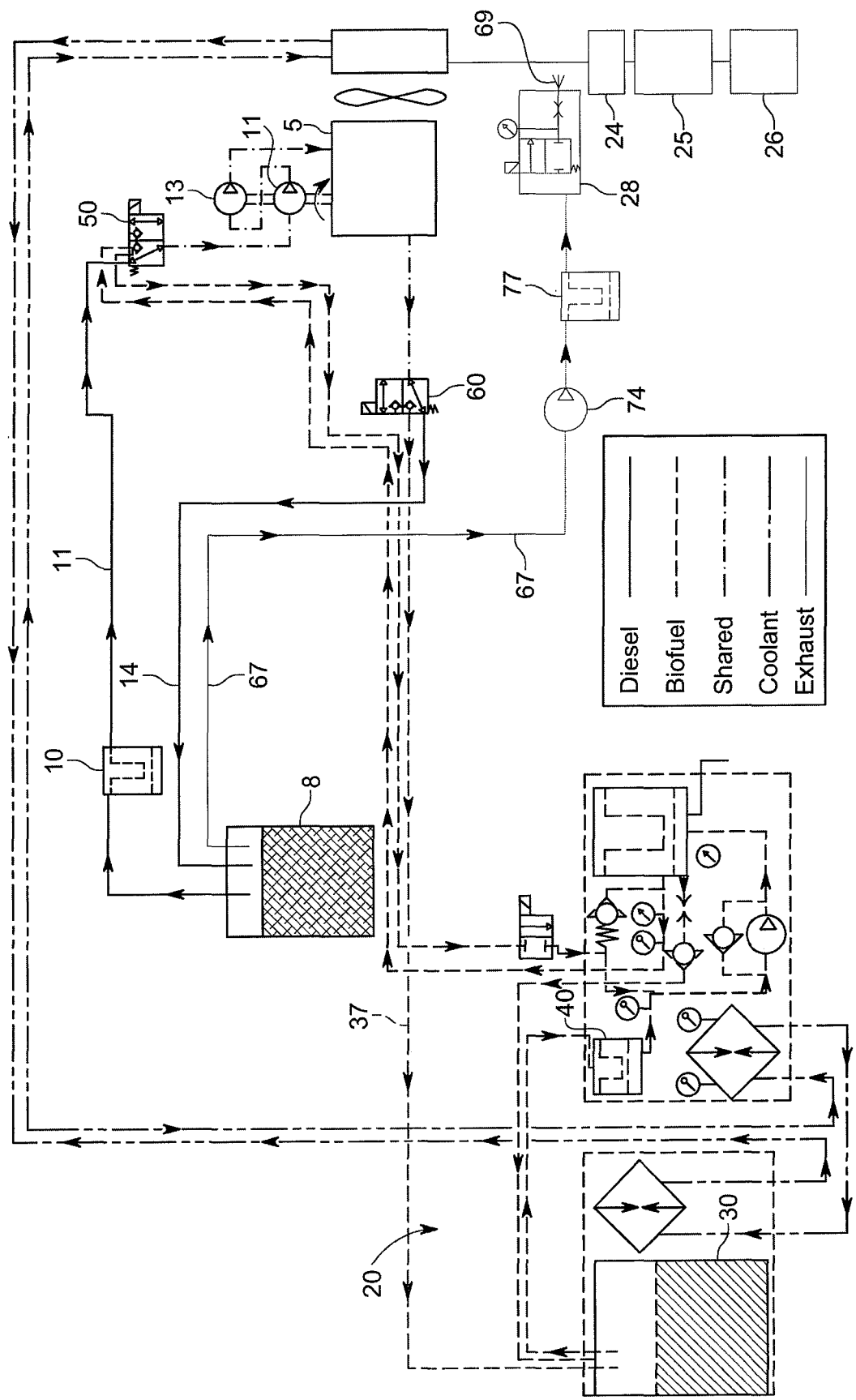
FIG. 4D is a configuration described in Embodiment 4, and specifically the simplified schematic view of FIG. 4B-2 which again, includes the corresponding reference numerals and which includes the modifications and features described in Embodiment 4.

In yet another embodiment as illustrated in FIGS. 4B-2 and 4D, dosing injector 69 receives the first fuel from the first fuel tank through a dedicated supply line 67 by way of a dedicated filter 77 and a dedicated dosing injector pump 74. In this embodiment, the engine 5 can be supplied with the second fuel while the dosing injector 69 is supplied only with the first fuel.

In still another embodiment illustrated in FIG. 4C, a dedicated fuel system for the second fuel is provided from second fuel tank 30, through the second fuel supply line 42 and second fuel filter 40 to engine 5. This embodiment and required modifications do not require a "dual fuel" system type approach as disclosed in other embodiments. Dosing injector 69 is isolated from secondary fuel line 42 and receives first fuel only from a dedicated first fuel tank 8A, first fuel supply line 11A and first fuel filter 10A. Dosing injector flush valve 70 is not required in this embodiment, since dosing injector 69 never receives the second fuel.

The invention claimed is:

1. A method of modifying the operation of an engine, having at least a fuel delivery system associated with a first fuel and an emissions control system, to enable operation with the first fuel and a second fuel, the method comprising the steps of:
providing the engine with a fuel supply system associated with the second fuel and an electronic control unit, the electronic control unit configured to communicate with at least the emissions control system, the fuel delivery system, and the fuel supply system;
operating the engine using the second fuel;
receiving, with the electronic control unit, notification from the emissions control system that a regeneration event is needed; and
supplying, with the fuel delivery system, the first fuel to the emissions control system for the regeneration event, wherein the first fuel is different from the second fuel.

2. The method of claim 1, further comprising the step of purging the second fuel from the engine prior to the regeneration event before supplying the first fuel to the emissions control system.

3. The method of claim 2, further comprising the step of delaying the regeneration event until the purging step is complete.

4. The method of claim 1, further comprising the step of inhibiting the regeneration event from occurring until a message is sent to the emissions control system by the electronic control unit to begin the regeneration event.

5. The method of claim 1, further comprising resuming operation of the engine using the second fuel after the regeneration event has completed.

6. The method of claim 1, wherein the first fuel is a petroleum-based fuel and the second fuel is an alternative fuel.

7. The method of claim 1, wherein the second fuel is unsuitable for a regeneration event.

8. The method of claim 1, wherein the step of operating the engine using the second fuel further comprises inhibiting the emissions control system from executing a regeneration event.

9. The method of claim 1, wherein the emissions control system comprises a dosing injector, a dosing fuel line, and a dosing flush valve in fluid communication with the engine's fuel delivery system and the electronic control unit directs the dosing flush valve to flush the second fuel out of the dosing injector and dosing fuel line by supplying the fuel delivery system with the first fuel prior to the emissions control system undergoing a regeneration event.

10. The method of claim 1, wherein the emissions control system comprises a dosing injector that is in fluid communication only with the first fuel.

11. The method of claim 1, wherein the engine further comprises a fuel selection valve for selectively providing the first fuel or the second fuel to the engine.

12. The method of claim 1, wherein the engine further comprises cylinders having combustion chambers and the first fuel is supplied to the emissions control system by injection into the combustion chambers during an exhaust stroke of the cylinders.

13. A method of modifying the operation of an engine to enable operation with a first fuel and a second fuel, the method comprising the steps of:
providing the engine with an electronic control unit, a fuel delivery system comprising a first fuel container for containing the first fuel and a second fuel container for containing second fuel, and an emissions control system, the electronic control unit configured to communicate with the emissions control system and the fuel delivery system;
operating the engine using the second fuel;
receiving, with the electronic control unit, notification from the emissions control system that a regeneration event is needed; and
supplying the first fuel to the emissions control system for the regeneration event,
wherein the first fuel is different from the second fuel.

14. The method of claim 13, wherein the first fuel is a petroleum-based fuel and the second fuel is an alternative fuel.

15. A fuel delivery system for delivering fuel to an engine, the fuel delivery system comprising:
- an electronic control unit configured to communicate with an emissions control system of the engine and a fuel supply system comprising a first fuel supply and a second fuel supply, the controller comprising at least one processor programmed or configured to:
- operate the engine with the second fuel;
- receive notification from the emissions control system that a regeneration event is needed; and
- supply the first fuel to the emissions control system for the regeneration event,
- wherein the first fuel is different from the second fuel.

16. The fuel delivery system of claim 15, wherein the at least one processor is further programmed or configured to purge the second fuel from the engine prior to the regeneration event before supplying the first fuel to the emissions control system.

17. The method of claim 15, wherein the at least one processor is further programmed or configured to resume operation of the engine using the second fuel after completion of the regeneration event.

18. The fuel delivery system of claim 15, wherein the first fuel is a petroleum-based fuel and the second fuel is an alternative fuel, and wherein the second fuel is unsuitable for the regeneration event.

19. The fuel delivery system of claim 15, wherein operating the engine using the second fuel further comprises inhibiting the emissions control system from executing a regeneration event.

20. The fuel delivery system of claim 15, wherein the electronic control unit is further configured to communicate with a fuel selection valve for selectively providing the first fuel or the second fuel to the engine.

* * * * *

UNITED STATES PATENT AND TRADEMARK OFFICE
CERTIFICATE OF CORRECTION

PATENT NO. : 12,305,583 B2
APPLICATION NO. : 18/272197
DATED : May 20, 2025
INVENTOR(S) : Colin N. Huwyler Page 1 of 1

It is certified that error appears in the above-identified patent and that said Letters Patent is hereby corrected as shown below:

In the Claims

Column 20, Line 1, Claim 17, delete "method" and insert -- fuel delivery system --

Signed and Sealed this
Twenty-ninth Day of July, 2025

Coke Morgan Stewart
*Acting Director of the United States Patent and Trademark Office*